(12) United States Patent
Hong et al.

(10) Patent No.: US 10,944,303 B2
(45) Date of Patent: Mar. 9, 2021

(54) LOW TORQUE RIPPLE SPOKE-TYPE PERMANENT MAGNET MOTOR

(71) Applicant: The Board of Trustees of The University of Alabama, Tuscaloosa, AL (US)

(72) Inventors: Yang-Ki Hong, Tuscaloosa, AL (US); Hoyun Won, Montgomery, AL (US); Woncheol Lee, Tuscaloosa, AL (US)

(73) Assignee: The Board of Trustees of The University of Alabama, Tuscaloosa, AL (US)

(*) Notice: Subject to any disclaimer, the term of this patent is extended or adjusted under 35 U.S.C. 154(b) by 471 days.

(21) Appl. No.: 16/038,983

(22) Filed: Jul. 18, 2018

(65) Prior Publication Data
US 2019/0027981 A1    Jan. 24, 2019

Related U.S. Application Data

(60) Provisional application No. 62/534,030, filed on Jul. 18, 2017.

(51) Int. Cl.
*H02K 1/27* (2006.01)
*H02K 1/02* (2006.01)
(Continued)

(52) U.S. Cl.
CPC ............... *H02K 1/276* (2013.01); *H02K 1/02* (2013.01); *H02K 1/12* (2013.01); *H02K 29/03* (2013.01);
(Continued)

(58) Field of Classification Search
CPC ............ H02K 1/276; H02K 1/02; H02K 1/12; H02K 29/03; H02K 1/165; H02K 2213/03
See application file for complete search history.

(56) References Cited

U.S. PATENT DOCUMENTS 8,102,091 B2    1/2012  Ionel
9,287,742 B2    3/2016  Reddy et al.
(Continued)

OTHER PUBLICATIONS

NTS, "Automotive Tests, Automotive Test Services", available at www.nts.com/services/industry_specific/automotive [First Accessed: Nov. 1, 2016].
(Continued)

*Primary Examiner* — Emily P Pham
(74) *Attorney, Agent, or Firm* — Meunier Carlin & Curfman LLC (57) ABSTRACT

Various implementations include a spoke-type rotor design that exhibits low torque ripple with competitive torque density. The rotor includes a rotor core, rotor core (RC) magnets, nonmagnetic caps disposed on an outer radial end of each RC magnet, and flux directing (FD) magnets disposed circumferentially between adjacent RC magnets. Each nonmagnetic cap has a radially tapered shape (e.g., trapezoidal). An outer radial end of each cap and an outer radial end of each RC magnet opening define an air gap therebetween. The magnetic flux directions of the RC magnets are circumferentially directed clockwise or counterclockwise, and the flux directions of circumferentially adjacent RC magnets are opposite from each other. The magnetic flux directions of the FD magnets are directed radially inwardly or outwardly, and the flux directions of circumferentially adjacent FD magnets are opposite from each other. The RC and/or FD magnets may include rare-earth free materials.

26 Claims, 8 Drawing Sheets

(51) Int. Cl.
*H02K 1/12* (2006.01)
*H02K 29/03* (2006.01)
*H02K 1/16* (2006.01)

(52) U.S. Cl.
CPC ......... *H02K 1/165* (2013.01); *H02K 2213/03* (2013.01)

(56) References Cited

U.S. PATENT DOCUMENTS

| 2015/0035402 | A1 | 2/2015 | Reddy et al. |
| 2015/0108868 | A1 | 4/2015 | Reddy et al. |
| 2017/0302145 | A1* | 10/2017 | Holenstein ............ A61M 1/101 |

OTHER PUBLICATIONS

Bianchi, et al., "Design techniques for reducing the cogging torque in surface-mounted PM motors," IEEE Trans. Ind. Appl., vol. 38, No. 5, pp. 1259-1265, Sep./Oct. 2002.

Cai, et al., "Low-Cost Ferrite PM-Assisted Synchronous Reluctance Machine for Electric Vehicles," IEEE Trans. Ind. Electron., vol. 61, No. 10, pp. 5741-5748, Oct. 2014.

Carraro, et al., "Design and comparison of interior permanent magnet synchronous motors with non-uniform airgap and conventional rotor for electric vehicle applications," IET Elec. Power Appl. vol. 8, iss. 6, pp. 240-249, Jan. 2014.

Carraro, et al., "Performance Comparison of Fractional Slot Concentrated Winding Spoke Type Synchronous Motors with Different Slot-Pole Combinations," Energy Conversion Congress and Exposition (ECCE), 2015 IEEE, 6067-6074, 2015.

Chiba et al., "Consideration of Number of Series Turns in Switched Reluctance Traction Motor Competitive to HEV IPMSM," IEEE Trans. Ind. Appl., vol. 48, No. 6, 2333-2340, Nov./Dec. 2012.

Fessler, et al., "Assessment of motor technologies for traction drives of hybrid and electric vehicles," Oak Ridge Nat. Lab., Oak Ridge, TN, USA, Rep. ORNL/TM-2011/73. 124 pages, Mar. 2011.

Galioto, et al., "Effects of Magnet Types on Performance of High-Speed Spoke Interior-Permanent-Magnet Machines Designed for Traction Applications," IEEE Trans. on Ind. Appl., vol. 51, pp. 2148-2160, May/Jun. 2015.

Gonzalez et al., "Design Consideration to Reduce Cogging Torque in Axial Flux Permanent-Magnet Machines", IEEE Trans. Magn, 43 (8), 3435-3440, Aug. 2007.

Guan, Zet al., "Comparison between induction machine and IPM for electric vehicle application," COMPEL, vol. 35, No. 2, pp. 572-585, Feb. 2016.

Hua, et al., "Investigation and Design of a High-Power Flux-Switching Permanent Magnet Machine for Hybrid Electric Vehicles," IEEE Trans. Magn. vol. 51, No. 3, pp. 8201805, Mar. 2015.

Kakihara, et al., "Rotor Structure in 50 kW Spoke-Type Interior Permanent Magnet Synchronous Motor with Ferrite Permanent Magnets for Automotive Applications," 2013 IEEE ECCE, pp. 606-613, Sep. 2013.

Kim et al., "Optimal PM Design of PMA-SynRM for Wide Constant-Power Operation and Torque Ripple Reduction," IEEE Trans. Magn. vol. 54, No. 10, pp. 4660-4663, Oct. 2009.

Kim, et al., "Investigation and Experimental Verification of a Novel Spoke-Type Ferrite-Magnet Motor for Electric-Vehicle Traction Drive Applications," IEEE Trans. Ind. Electron., vol. 61, pp. 5763-5770, Oct. 2014.

Kimiabeigi et al., "High-Performance Low-Cost Electric Motor for Electric Vehicles Using Ferrite Magnets," IEEE Trans. Ind. Electron., vol. 63, pp. 113-122, Jan. 2016.

Koch, et al., "New Material for Permanent Magnets on a Base of Mn and Al", J. Appl. Phys. vol. 31 pp. 75S, 1960.

Kondo, "A New PMAssisted Synchronous Reluctance Motor with Three-Dimensional Trench Air Gap," IEEE Trans. Ind. Appl., vol. 50, No. 4, pp. 2485-2492, Jul./Aug. 2014.

Kramer et al., "Prospects for Non-Rare Earth Permanent Magnets for Traction Motors and Generators", Journal of Metals, 64, 752-763, 2012.

Liu, et al., "Research on the Performances and Parameters of IPMSM Used for Electric Vehicles," IEEE Trans. Ind. Electron. vol. 63, No. 6, pp. 3533-3545, Jun. 2016.

Fazil, "A Novel Air-Gap Profile of Single-Phase Permanent-Magnet Brushless DC Motor for Starting Torque Improvement and Cogging Torque Reduction", IEEE Trans. Magn, 46 (11), 3928-3932, Nov. 2010.

Niedra, "M-H Characteristics and Demagnetization Resistance of Samarium-Cobalt Permanent Magnets to 300 C," Sverdrup Tech. Inc., Brook Park, OH, NAS3-25266, Aug. 2012.

Obata, et al., "Performance of PMASynRM with Ferrite Magnets for EV/HEV Applications Considering Productivity," IEEE Trans. Ind. Appl., vol. 50, pp. 2427-2435, Jul./Aug. 2014.

Ozpineci, et al., "Scalable Non-Rare Earth Motor Development," in Oak Ridge National Laboratory Annual Progress Report for the Power Electronics and Electric Motors Program, Oak Ridge Nat. Lab., Oak Ridge, TN, USA, Rep. ORNL/TM-2011/73. Mar. 2011.

Poudyal et al., "Processing of MnBi bulk magnets with enhanced energy product," AIP Advances, vol. 6, pp. 056004, Feb. 2016.

Miller, "Electric Motor R&D," U.S. DOE Hydrogen and Fuel Cells Program and Vehicle Technologies Program Annual Merit Review and Peer Evaluation Meeting. 21 pages, 2013.

Ruoff, "A closer look at torque ripple—minimizing its effects on lectric machines," Chargedvehicles, Sep. 2011.

Steiert, "Integrated solutions for noise and vibration control in vehicles," available at http://www.transport-rescarch.info/project/integrated-solutions-noise-and-vibration-control-vehicles [First Accessed: Nov. 1, 2016].

Zeng, et al., "Structural and magnetic properties of nanostructured Mn—Al—C magnetic materials," J. Magn. Magn. Mat., vol. 38, pp. 214-226, Jul. 2006.

Zhao, et al., "Torque Pulsation Minimization in Spoke-type IPM Motors with Skewing and Sinusoidal PM Configurations," IEEE Trans. Magn,. vol. 51, No. 11, pp. 8110804, Nov. 2015.

* cited by examiner

LOW TORQUE RIPPLE SPOKE-TYPE PERMANENT MAGNET MOTOR

CROSS REFERENCE TO RELATED APPLICATIONS

This application claims the benefit of U.S. Provisional Patent Application No. 62/534,030, filed Jul. 18, 2017, the content of which is incorporated herein by reference in its entirety.

BACKGROUND

Owing to high power density, high efficiency, and wide constant power operating regions, an interior permanent magnet synchronous machine (IPMSM) with rare-earth permanent magnet (REPM) has been widely adopted in hybrid electric vehicles (HEVs) and electric vehicles (EVs). However, the cost and unstable supply of rare-earth (RE) minerals cause problems for automakers to manufacture the motor at constant low cost.

RE-free permanent magnet (PMs), such as commercial ferrite and alnico, exhibit lower magnetization than that of REPM. The lower magnetization leads to a low resultant air-gap flux and, therefore, a poor torque performance in a PM motor. To compensate for the low torque performance, one approach is to employ a flux concentration effect, which uses two adjacent PMs with opposite magnetization direction. An IPMSM with the rotor using flux concentration effect is called a spoke-type IPMSM (S-IPMSM). However, the S-IPMSM suffers from a high torque ripple, which increases unwanted noise, vibration, and harshness (NVH) in a vehicle. The high NVH results in an uncomfortable ride, low fuel efficiency, and low durability of components of the vehicle, as discussed in NTS, "Automotive Tests, Automotive Test Services", available at www.nts.com/services/industry_specific/automotive [Accessed: Nov. 1, 2016] and M. Steiert, "Integrated solutions for noise and vibration control in vehicles," available at http://www.transport-researchinfo/project/integrated-solutions-noise-and-vibration-control-vehicles [Accessed: Nov. 1, 2016]. Accordingly, the torque ripple of the motor needs to be alleviated.

To reduce the torque ripple in S-IPMSM, a dovetail shaped S-IPMSM and non-uniform gapped S-IPMSMs have been proposed in U.S. Pat. No. 9,287,742 and U.S. Patent Application Publication No. 2015/0108868. However, these proposed machines are hard to manufacture, due to their complex shapes, which need special types of dies and tools and more time to cut the rotor, especially for non-uniform shaped rotors. Furthermore, the torque ripple is still high.

Therefore, a rotor that exhibits low torque ripple with competitive torque density and economic manufacturing cost is needed in the art.

SUMMARY

Various implementations include electric rotors. For example, in various implementations, an electric motor includes a cylindrical rotor core having a first end and a second end and an outer surface that extends between the first end and the second end. The cylindrical rotor core defines a central opening, at least two rotor core magnet openings, and at least two flux directing magnet openings. Each opening extends axially between the first end and the second end of the cylindrical rotor core. The cylindrical rotor core includes a soft magnetic material. Each rotor core magnet opening is defined radially between the central opening and the outer surface of the cylindrical rotor core and has an inner radial end and an outer radial end that are radially spaced apart from each other a radial length. Each flux directing magnet opening is defined radially between the central opening and the outer surface of the cylindrical rotor core and circumferentially between adjacent rotor core magnet openings. The rotor core magnet openings and the flux directing magnet openings are circumferentially spaced apart, and at least one of the flux directing magnet openings is defined circumferentially between two circumferentially adjacent rotor core magnet openings.

The electric rotor further includes at least two rotor core magnets each having a magnetic flux. Each rotor core magnet is disposed within the respective rotor core magnet opening adjacent the inner radial end of the respective rotor core magnet opening. The magnetic flux directions of the rotor core magnets are circumferentially directed clockwise or counterclockwise, and the direction of the magnetic flux of circumferentially adjacent rotor core magnets are opposite from each other. The electric rotor includes at least two nonmagnetic caps. Each nonmagnetic cap is disposed radially between the outer radial end of the respective rotor core magnet opening and an outer radial end of the respective rotor core magnet disposed within the respective rotor core magnet opening. The electric rotor also includes at least two flux directing magnets. Each flux directing magnet is disposed within the respective flux directing magnet opening. The magnetic flux directions of the at least two flux directing magnets are directed radially inwardly or outwardly and the magnetic flux directions of circumferentially adjacent flux directing magnets are opposite from each other.

Each flux directing magnet has an inner radial end and an outer radial end that are radially spaced apart from each other. The inner radial end of the flux directing magnet is disposed radially outwardly of the inner radial ends of circumferentially adjacent rotor core magnet openings and the outer radial end of the flux directing magnet opening is disposed radially inwardly of the outer radial ends of the circumferentially adjacent rotor core magnet openings.

In some implementations, each nonmagnetic cap includes two surfaces that are circumferentially spaced apart and taper toward each other in a radially outward direction. In some implementations, each nonmagnetic cap has a trapezoidal cross sectional shape as viewed from an axial direction. In some implementations, each nonmagnetic cap has a semi-circular cross sectional shape as viewed from an axial direction.

In some implementations, each nonmagnetic cap has an outer radial end, and the outer radial end of each nonmagnetic cap and the outer radial end of each rotor core magnet opening are spaced apart and define a gap there between.

In some implementations, the outer surface of the cylindrical rotor core defines at least two grooves that extend axially between the first and second ends of the cylindrical rotor core. Each groove is circumferentially spaced between adjacent rotor core magnet openings. In some implementations, each groove is radially aligned with a respective flux directing magnet. In some implementations, the grooves have a triangular cross sectional shape as viewed from an axial direction.

In some implementations, a cross-sectional shape of each flux directing magnet as viewed from an axial direction is rectangular, triangular, trapezoidal, or semi-circular.

In some implementations, the flux directing magnets are rare-earth free permanent magnets. In some implementations, the flux directing magnets comprise $SrFe_{12}O_{19}$ or low temperature phase (LTP)-MnBi.

In some implementations, the rotor core magnets are rare-earth free permanent magnets. In some implementations, the rotor core magnets comprise $SrFe_{12}O_{19}$ or low temperature phase (LTP)-MnBi.

In some implementations, the rotor core magnets and the flux directing magnets are low temperature phase (LTP)-MnBi magnets.

In some implementations, the rotor core magnets are low temperature phase (LTP)-MnBi magnets and the flux directing magnets are $SrFe_{12}O_{19}$.

In some implementations, the rotor core magnets comprise $SrFe_{12}O_{19}$ magnets and the flux directing magnets comprise $Nd_2Fe_{14}B$ magnets.

In some implementations, the flux directing magnets comprise rare-earth permanent magnets. In some implementations, the flux directing magnets comprise $Nd_2Fe_{14}B$.

In some implementations, the rotor core magnets comprise rare-earth permanent magnets. In some implementations, the cylindrical rotor core directing magnets comprise $Nd_2Fe_{14}B$.

Other various implementations include an electric rotor including a cylindrical rotor core having a first end and a second end and an outer surface that extends between the first end and the second end. The cylindrical rotor core defines a central opening and at least two rotor core magnet openings. Each opening extends axially between the first end and the second end of the cylindrical rotor core. The cylindrical rotor core includes a soft magnetic material. Each rotor core magnet opening is defined radially between the central opening and the outer surface of the cylindrical rotor core and has an inner radial end and an outer radial end that are radially spaced apart from each other a radial length. The rotor core magnet openings are circumferentially spaced apart.

The electric rotor further includes at least two rotor core magnets each having a magnetic flux. Each rotor core magnet is disposed within the respective rotor core magnet opening adjacent the inner radial end of the respective rotor core magnet opening. The magnetic flux directions of the rotor core magnets are circumferentially directed clockwise or counterclockwise, and the direction of the magnetic flux directions of circumferentially adjacent rotor core magnets are opposite from each other. The electric rotor also includes at least two nonmagnetic caps. Each nonmagnetic cap is disposed radially between the outer radial end of the respective rotor core magnet opening and an outer radial end of the respective rotor core magnet disposed within the respective rotor core magnet opening. Each nonmagnetic cap includes two surfaces that are circumferentially spaced apart and taper toward each other in a radially outward direction.

In some implementations, each nonmagnetic cap has a trapezoidal shaped cross section.

In some implementations, each nonmagnetic cap has a semi-circular shaped cross section.

In some implementations, the cylindrical rotor core further defines at least two flux directing magnet openings. Each flux directing magnet opening extends between the first end and the second end of the cylindrical rotor core. Each flux directing magnet opening is defined radially between the central opening and the outer surface of the cylindrical rotor core and circumferentially between adjacent rotor core magnet openings. The rotor core magnet openings and the flux directing magnet openings are circumferentially spaced apart and at least one of the flux directing magnet openings are defined circumferentially between adjacent rotor core magnet openings. The rotor further includes at least two flux directing magnets disposed within respective flux directing magnet openings. The magnetic flux directions of the at least two flux directing magnets are directed radially inwardly or radially outwardly and the flux directions of circumferentially adjacent flux directing magnets are opposite each other. Each flux directing magnet has an inner radial end and an outer radial end that are radially spaced apart from each other. The inner radial end of the flux directing magnet is disposed radially outwardly of the inner radial ends of circumferentially adjacent rotor core magnet openings and the outer radial ends of the flux directing magnets are disposed radially inwardly of the outer radial ends of the circumferentially adjacent rotor core magnet openings.

In some implementations, the cylindrical rotor core defines at least one void that extends axially between the first end and the second end of the cylindrical rotor core. The at least one void is circumferentially spaced apart from circumferentially adjacent rotor core openings. In some implementations, the void is triangular shaped.

BRIEF DESCRIPTION OF THE DRAWINGS

These and other features, aspects, and advantages of various implementations will become apparent from the following description and the accompanying example implementations shown in the drawings, which are briefly described below.

DETAILED DESCRIPTION

Various implementations include a spoke-type rotor that exhibits low torque ripple with competitive torque density and uses RE-free PMs. For example, in some implementations, an electric rotor includes a cylindrical rotor core, at least two rotor core magnets, at least two nonmagnetic caps, and at least two flux directing magnets. The cylindrical rotor core has a first end and a second end and an outer surface that extends between the first end and the second end. The cylindrical rotor core defines a central opening, at least two rotor core magnet openings, and at least two flux directing magnet openings. Each opening extends axially between the first end and the second end of the cylindrical rotor core. The cylindrical rotor core comprises a soft magnetic material, and each rotor core magnet opening is defined radially between the central opening and the outer surface of the rotor core and has an inner radial end and an outer radial end that are radially spaced apart from each other a first radial length. Each flux directing magnet opening is defined radially between the central opening and the outer surface of the rotor core and circumferentially between adjacent rotor core magnet openings. Each flux directing magnet has an inner radial end and an outer radial end that are radially spaced apart from each other, and the inner radial end of the flux directing magnet is disposed radially outwardly of the inner radial ends of circumferentially adjacent rotor core magnet openings. The outer radial end of the flux directing magnet opening is disposed radially inwardly of the outer radial ends of circumferentially adjacent rotor core magnet openings. The rotor core magnet openings and the flux directing magnet openings are circumferentially spaced apart. Each rotor core magnet is disposed adjacent the inner radial end of each respective rotor core magnet opening. The magnetic flux directions of the rotor core magnets are circumferentially directed clockwise or counterclockwise, and the flux directions of circumferentially adjacent rotor core magnets are opposite from each other. The nonmagnetic caps are each disposed radially between the outer radial end of each respective rotor core magnet opening and an outer radial end of each respective rotor core magnet disposed within the respective rotor core magnet opening. Each flux directing magnet is disposed within a respective flux directing magnet opening, and the magnetic flux directions of the flux directing magnets are directed radially inwardly or outwardly and the flux directions of circumferentially adjacent flux directing magnets are opposite from each other.

Figure 1A:
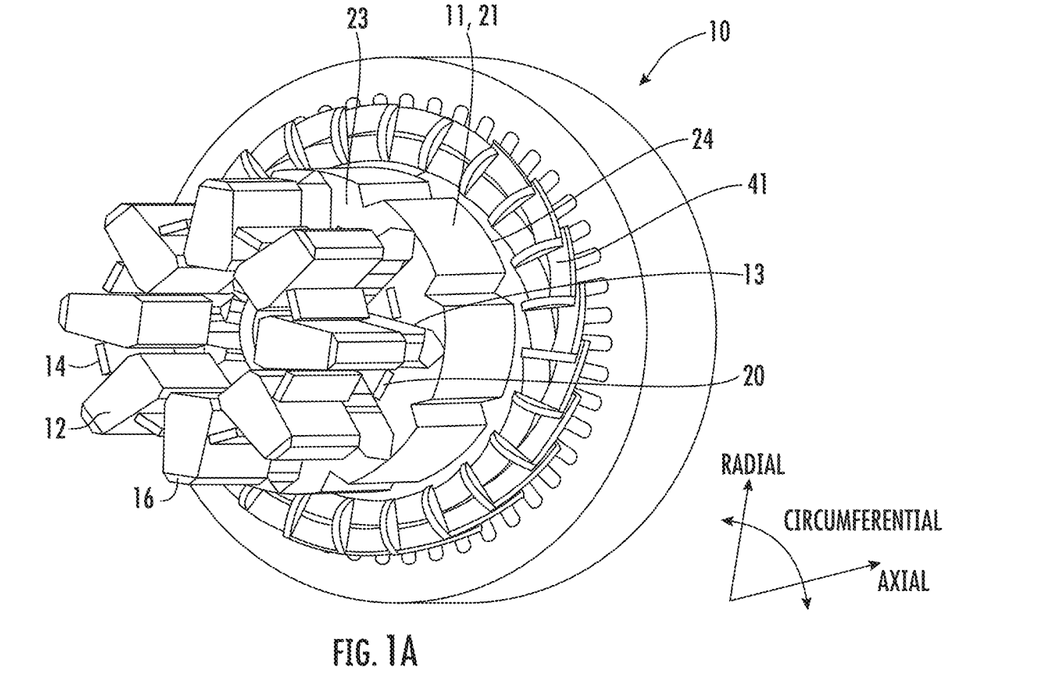
FIG. 1A is a perspective exploded view of a stator and rotor configuration for a torque ripple suppressed S-IPMSM, according to one implementation.
Figure 1B:
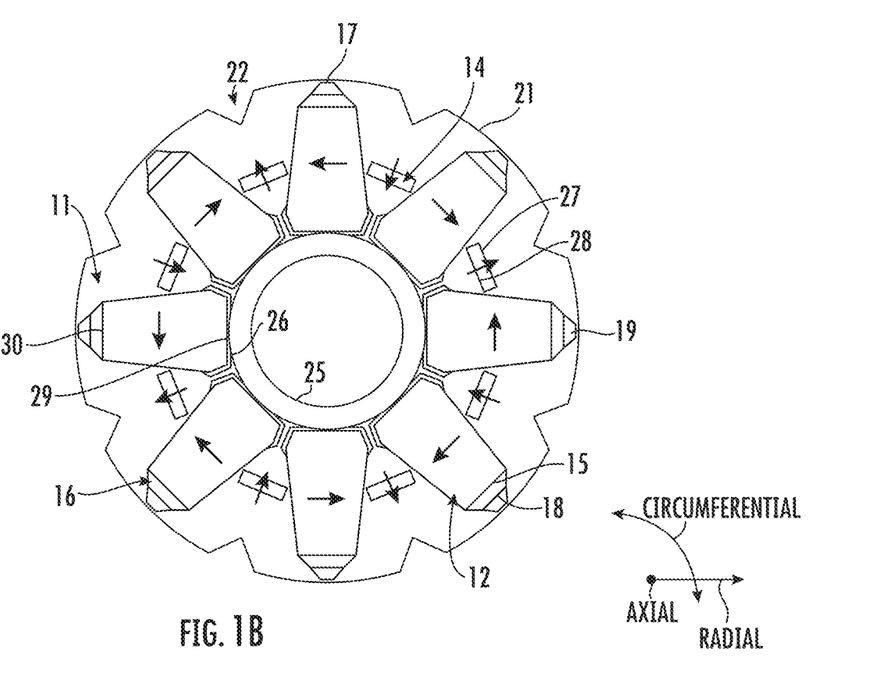
FIG. 1B is a plan view of the assembled torque ripple suppressed S-IPMSM shown in FIG. 1A.

For example, one implementation is shown in FIGS. 1A and 1B. The torque ripple suppressed S-IPMSM 10 comprises a stator 41, a cylindrical rotor core 11, eight rotor core permanent magnets (RCPMs) 12, eight flux directing permanent magnets (FDPMs) 14, and eight isosceles trapezoidal shaped nonmagnetic caps 16. The rotor core 11 has a first end 23, a second end 24, an outer surface 21 that extends between the first end 23 and the second end 24. The rotor core 11 also defines a central opening 25, eight rotor core magnet openings 13, and eight flux directing magnet openings 20. The openings 25, 13, 20 extend between the first end 23 and the second end 24. Each rotor core magnet opening 13 is defined radially between the central opening 25 and the outer surface 21 of the rotor core 11 and has an inner radial end 26 and an outer radial end 17 that are spaced apart from each other a radial length. Each flux directing magnet opening 20 is defined radially between the central opening 25 and the outer surface 21 of the rotor core 11 and is circumferentially between adjacent rotor core magnet openings 13.

Each rotor core magnet 12 is disposed within a respective rotor core magnet opening 13. An inner radial end 29 of each rotor core magnet 12 is disposed adjacent the inner radial end 26 of the rotor core magnet opening 13, and an outer radial end 30 of each rotor core magnet 12 is spaced apart from the outer radial end 17 of the rotor core magnet opening 13. The magnetic flux directions of rotor core magnets 12 are circumferentially directed clockwise or counterclockwise, and the flux directions of circumferentially adjacent rotor core magnets 12 are opposite from each other, which is shown by the circumferential arrows shown in FIG. 1B.

Each flux directing magnet 14 has an inner radial end 28 and an outer radial end 27 that are radially spaced apart from each other. The inner radial end 28 of each flux directing magnet 14 is disposed radially outwardly of the inner radial ends 29 of circumferentially adjacent rotor core magnets 12, and the outer radial end 27 of each flux directing magnet 14 is disposed radially inwardly of the outer radial end 17 of circumferentially adjacent rotor core magnet openings 13.

Figure 8:
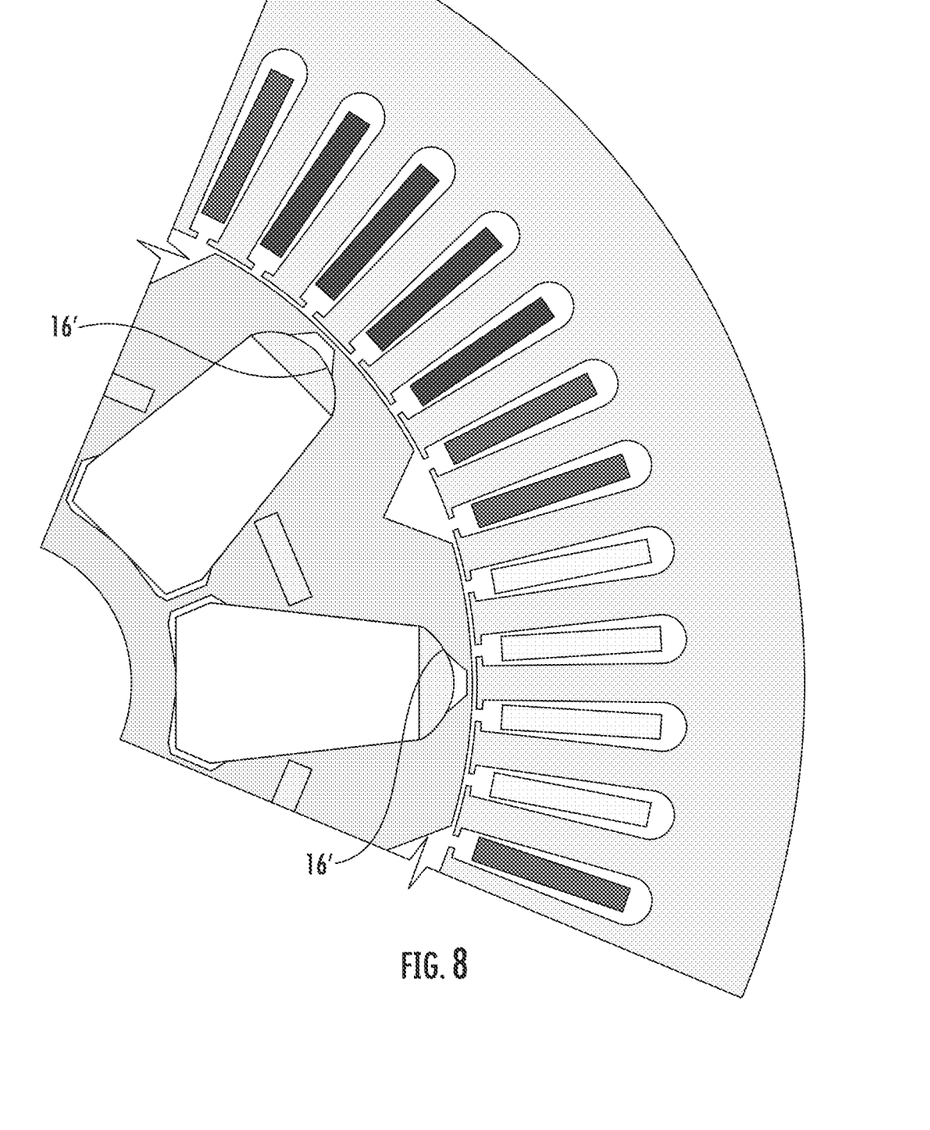
FIG. 8 illustrates a partial view of a rotor core with caps having a semi-circular cross sectional shape as viewed from the axial direction, according to another implementation.

Each nonmagnetic cap 16 is disposed radially between the outer radial end 30 of the rotor core magnet 12 and the outer radial end 17 of the rotor core magnet opening 13. Each cap 16 includes two surfaces that are circumferentially spaced apart and taper toward each other in a radially outward direction. For example, the cap 16 may have a trapezoidal cross sectional shape as viewed from an axial direction of the rotor core 11, as shown in FIGS. 1A-1B, or the cap 16' may have a semi-circular cross sectional shape as viewed from the axial direction, which is shown in FIG. 8. An inner radial end 15 of each cap 16 is in contact with the outer radial end 30 of a respective rotor core magnet 12, and an outer radial end 18 of the cap 16 is spaced apart from the outer radial end 17 of a respective rotor core magnet opening 13 to define gap 19. The gap 19 shown in FIGS. 1A and 1B is substantially trapezoidal, but other implementations may include another suitable shape such as triangular or semi-circular shaped gaps, for example, or the gap shape as shown in FIG. 8, which has an arcuate inner radial surface, planar and tapered side edges, and a planar outer radial surface.

In the implementation shown in FIGS. 1A-1B, the cross-sectional shape of each flux directing magnet opening 20 and each flux directing permanent magnet 14 as viewed from an axial direction is rectangular. However, in other implementations, the cross-sectional shape of each flux directing permanent magnet 14 and the flux directing magnet opening 20 may be another suitable shape, such as triangular, trapezoidal, oval, circular, or semi-circular, for example.

In addition, in the implementation shown in FIGS. 1A-1B, the outer surface 21 of the cylindrical rotor core 11 defines at least two grooves 22 that extend axially between the first 23 and second ends 24 of the core. Each groove 22 is circumferentially spaced between adjacent rotor core magnet openings 13 and is radially aligned with a respective flux directing magnet 14. In addition, the grooves 22 have a triangular cross sectional shape as viewed from an axial direction. However, in other implementations, the grooves 22 may not be aligned with each respective flux directing magnet 14, and the grooves 22 may have another suitable cross-sectional shape, such as trapezoidal, rectangular, or semi-circular, for example. The grooves help redirect and block the unnecessary winding flux that causes torque reduction and torque ripple.

Furthermore, in the implementation shown in FIGS. 1A-1B, the flux directing permanent magnets 14 and the rotor core permanent magnets 12 are rare-earth free permanent magnets. For example, the flux directing permanent magnets 14 and the rotor core permanent magnets 12 may include $SrFe_{12}O_{19}$ (which may also be abbreviated SrM herein) or low temperature phase (LTP)-MnBi (which may be abbreviated MnBi herein). In other implementations, the flux directing permanent magnets 14 and/or the rotor core permanent magnets 12 include rare-earth materials, such as $Nd_2Fe_{14}B$ (which may be abbreviated NdFeB herein). And, in some implementations, one of the rotor core permanent magnets 12 or the flux directing permanent magnets 14 includes a rare earth material, such as $Nd_2Fe_{14}B$, and the other of the flux directing permanent magnets 14 or rotor core permanent magnets 12 includes a rare earth free material, such as $SrFe_{12}O_{19}$ or low temperature phase (LTP)-MnBi. For example, in one implementation, the rotor core permanent magnets 12 include $SrFe_{12}O_{19}$ magnets and the flux directing permanent magnets 14 include $Nd_2Fe_{14}B$ magnets.

The nonmagnetic caps 16 are made of a nonmagnetic material, such as materials with a magnetic permeability of $\alpha \leq 1.5$ and low electrical conductivity. Example materials include any type of polyester, rubber, or plastics.

The rotor core 11 is made of a soft magnetic material, or materials that are easily magnetized and demagnetized but cannot serve as a magnetic field source like permanent magnets. Soft magnetic materials have low retentivity, coercivity below 1000 A/m, initial permeability higher than 500, core loss below 2.04 W/kg at 1.7 Tesla, and remanent flux density higher than 0.3 T. Example materials include any Si-steel-related core, soft magnetic composite (SMC), or Mn—Zn ferrite.

The flux orientation of the rotor core permanent magnets 12 and flux directing permanent magnets 14 and the physical dimensions and operating conditions of the S-IPMSM 10 are summarized in Table I below. The inclusion of the flux directing permanent magnets 14 and the isosceles trapezoidal shaped nonmagnetic caps 16 at the outer radial end 30 of each rotor core permanent magnets 12 not only decreases the torque ripple by 50% and 62.9% at 20° C. and 125° C., respectively, but also enhances the total average torque by 7.1% and 12.5% at 20° C. and 125° C., respectively, as compared to a conventionally made S-IPMSM, according to some implementations. The maximum power and efficiency of the example inventive S-IPMSM 10 are 58.8 kW and 97.2%, respectively. In addition, to reduce the cost of the S-IPMSM 10, RE-free PMs, such as low temperature phase (LTP)-MnBi or strontium ferrite (SrM), are used. In other implementations, RE-free PMs are used with rare earth permanent magnets, such as NdFeB. Therefore, the torque ripple suppressed S-IPMSM 10 is suitable for the EV applications with low cost and high reliability.

TABLE I

Specifications of the conventional S-IPMSM and invented torque ripple suppressed S-IPMSM 10

| Parameter | Value |
|---|---|
| Stator outer diameter [mm] | 269 |
| Rotor outer diameter [mm] | 160 |
| Stack length [mm] | 50.8 |
| Airgap [mm] | 0.75 |
| Number of poles/slots | 8/48 |
| # of turns per coil | 11 |
| Battery voltage [V] | 500 |
| Peak current [$A_{rms}$] | 177 |
| Core material | Nonoriented M19-29 |

Figure 2A:
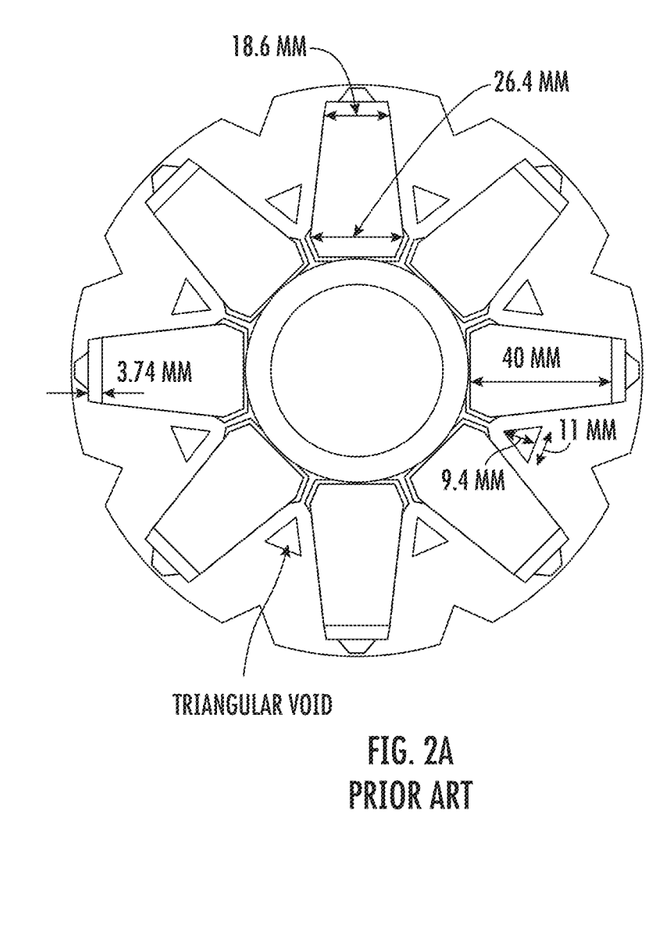
FIG. 2A. Illustrates a rotor geometry of a conventional S-IPMSM.
Figure 2B:
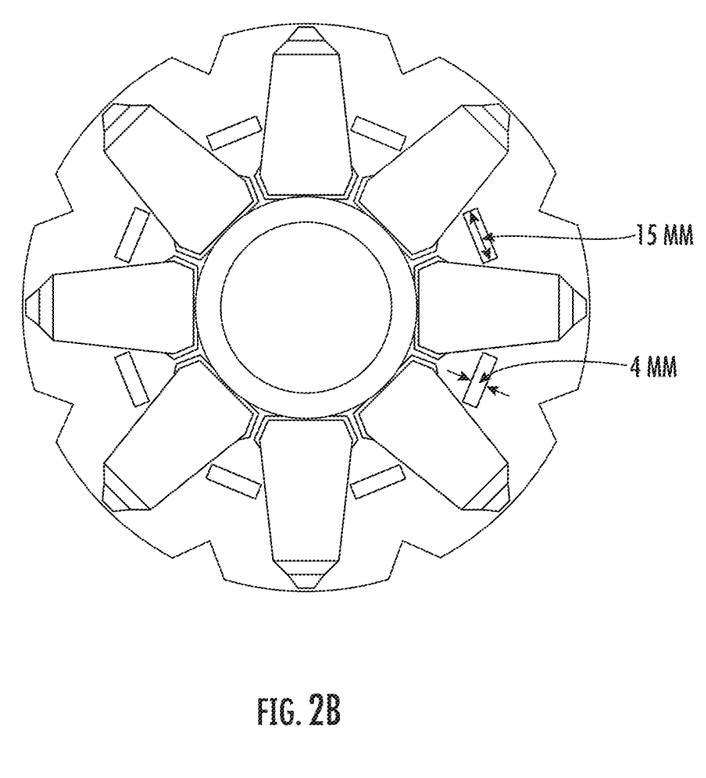
FIG. 2B illustrates a rotor geometry of the motor in FIG. 1A.
Figure 3A:
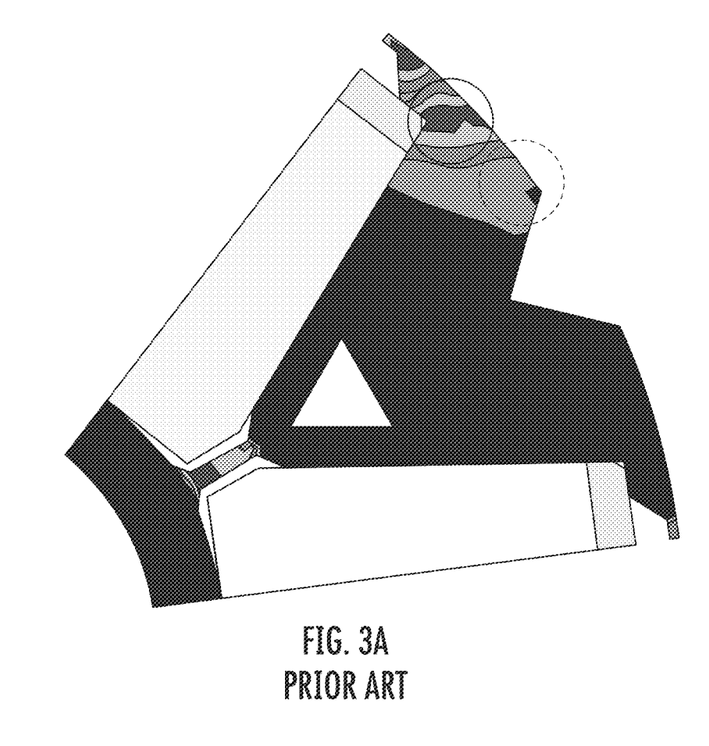
FIG. 3A illustrates a magnetic flux density distribution of the conventional S-IPMSM shown in FIG. 2A.
Figure 3B:
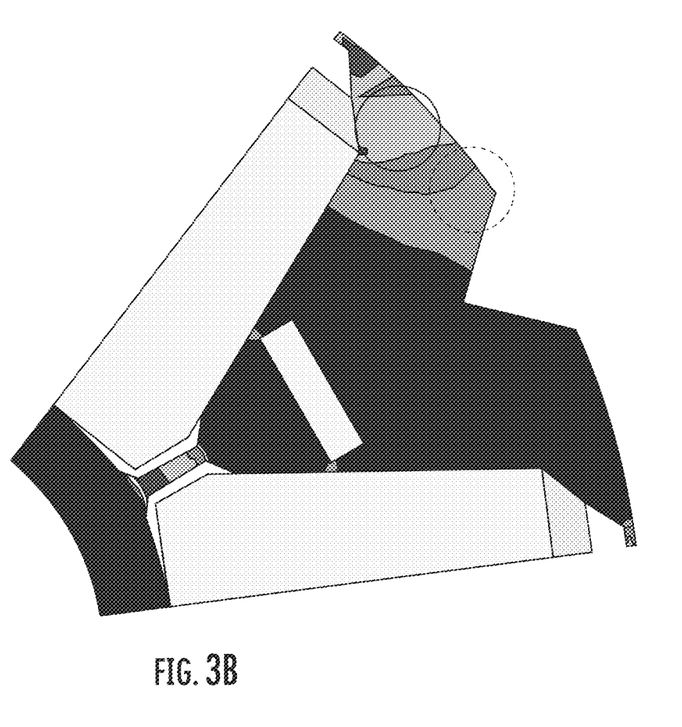
FIG. 3B illustrates a magnetic flux density distribution of the torque ripple suppressed S-IPMSM with flux directing permanent magnet (FDPM) shown in FIG. 1A.

FIG. 2A shows the rotor configuration of the conventional design, and FIG. 2B shows the rotor configuration of the torque ripple suppressed S-IPMSM 10 shown in FIGS. 1A and 1B. Both designs used the same geometry and dimensions for the stator and the rotor, as shown in Table I. Both rotors used eight RC PMs, each with a cross-sectional area of 908 $mm^2$ Each RC PM of the conventional design shown in FIG. 2A has a rectangular nonmagnetic cap on its outer radial surface. However, in rotor core 11 shown in FIG. 2B, the isosceles trapezoidal shaped nonmagnetic cap 16 is employed to lessen the saturation of the flux through the rotor adjacent its outer surface 21. This lessened saturation of flux through the rotor can be confirmed by the magnetic flux density distribution shown in FIGS. 3A and 3B. As FIGS. 3A and 3B show, the flux density in the solid circle of the conventional S-IPMSM design shown in FIG. 2A exhibits higher flux density than that of the torque ripple suppressed S-IPMSM 10 shown in FIG. 1A, where this higher flux lead to severe distortion on the air-gap flux, degradation of output torque, and aggravation of torque pulsations. See W. Zhao, T. A. Lipo, and B. Kwon, "Torque Pulsation Minimization in Spoke-type IPM Motors with Skewing and Sinusoidal PM Configurations," *IEEE Trans. Magn.*, vol. 51, no. 11, pp. 8110804, November 2015. For the two rotor designs, isosceles trapezoidal shaped air gaps 19 are defined radially between the outer radial surface of the nonmagnetic caps and the outer radial end of the rotor core magnet openings, respectively. Lastly, while the conventional S-IPMSM design defined an 11 mm wide and 9.4 mm long triangular void between the RC PMs, one implementation of the torque ripple suppressed S-IPMSM 10 includes a 15 mm wide and 4 mm long rectangular flux directing permanent magnet opening 13 and a respective flux directing permanent magnet 14 (FD PM) disposed therein. The inclusion of the FD PM 14, in lieu of the triangular void, enhances the average torque and decreases the torque ripple, which is attributed to enlarged flux density, as indicated with dashed circles in FIGS. 3A and 3B, which ranges from 1.9 T to 2.1 T, through the rotor near its outer surface 21. Thus, the inclusion of the FD PMs 14 results in more balanced flux density through the rotor 11 near its outer surface 21, since the difference between the flux density in the solid and dashed circles for the torque ripple suppressed S-IPMSM 10 are less, compared to the conventional S-IPMSM design. It is noted that unbalanced flux in each rotor segment leads to higher torque ripple. See W. Kim et al., "Optimal PM Design of PMA-SynRM for Wide Constant-Power Operation and Torque Ripple Reduction," *IEEE Trans. Magn.* vol. 54, no. 10, pp. 4660-4663, October 2009. Thus, due to lower flux density at the edge and higher uniformity of flux density across the rotor, lower torque ripple and enhanced torque density was observed in the torque ripple suppressed S-IPMSM 10.

Figure 4:
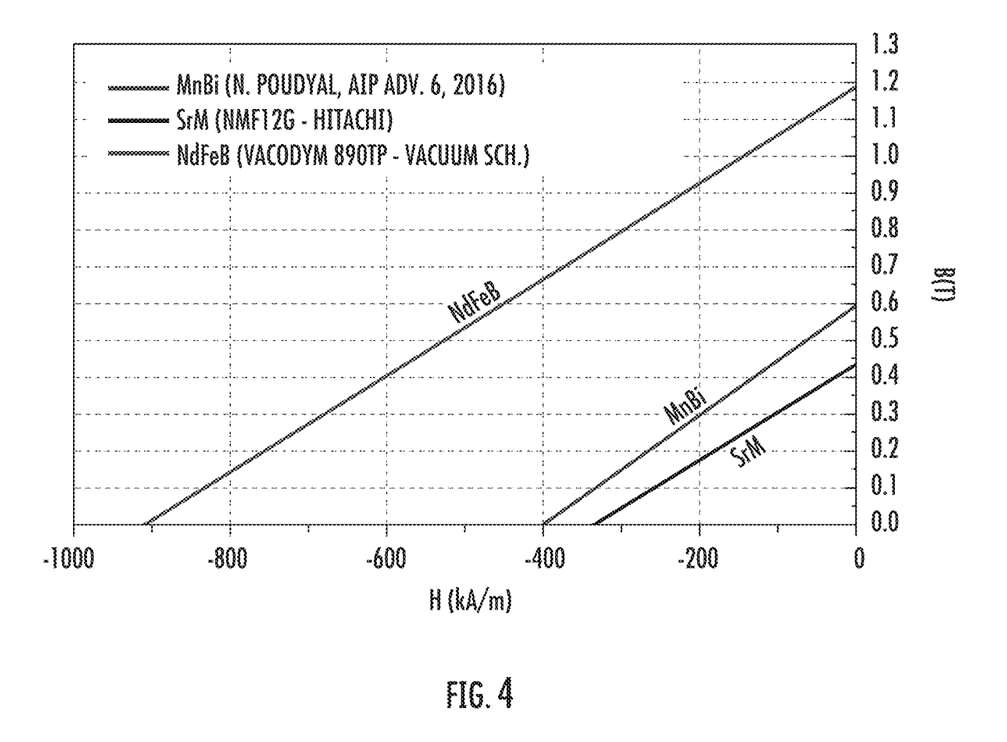
FIG. 4 illustrates a demagnetization chart for each of the following permanent magnet materials: LTP-MnBi (MnBi), strontium ferrite (SrM), and Nd—Fe—B.

To investigate the effect of the type of different PM materials on the motor performance, three types of PMs, including LTP-MnBi, strontium ferrite (SrM), and NdFeB, were analyzed. The demagnetization curves of the three PMs are illustrated in FIG. 4. The magnetic parameters for each PM were either experimentally verified or obtained from data sheets for commercial products. See Q. Zeng, I. Baker, J. B. Cui, and Z. C. Yan, "Structural and magnetic properties of nanostructured Mn—Al—C magnetic materials," *J. Magn. Magn. Mat.*, vol. 38, pp. 214-226, July 2006; N. Poudyal et al., "Processing of MnBi bulk magnets with enhanced energy product," *AIP Advances*, vol. 6, pp. 056004, February 2016; Hitachimetals, "NMF series" [Online]. Available: http://www.hitachimetals.com [Accessed:

Sep. 14, 2016]; and Vacuum Schmelze, "Vacodym 890 TP datasheet," available at www.vacuumschmelze.com [Accessed: Nov. 1, 2016].

Tables II and III summarize the torque performance of the torque ripple suppressed S-IPMSM 10 using combinations of three different types of permanent magnets for flux directing and rotor core magnets at 20° C. and 125° C., respectively. The torque and torque ripple of the conventional S-IPMSM design are 175 Nm and 13.4% at 20° C., respectively, and 160 Nm and 19.7% at 125° C., respectively. It is noted that all results for both the conventional S-IPMSM and the torque ripple suppressed S-IPMSM designs are evaluated at base speed (3,000 revolutions per minutes (rpm)) and maximum current (177 $A_{rms}$). For both temperatures, the average torques of the torque ripple suppressed S-IPMSM 10 using combinations of the three types of PMs are higher than that of the conventional S-IPMSM design. The torque ripple performance of the torque ripple suppressed S-IPMSM 10 using combinations of the three types of PMs is lesser than that of the conventional S-IPMSM design. The result clearly shows that there is linear proportionality between remanent flux density, $B_r$, of the RC and FD magnet and average torque. As for the torque ripple, a positive quadratic trend between the torque ripple and the $B_r$ of the magnet is observed for both temperatures. Among the combinations of the PMs, using MnBi for the RC PMs and the FD PMs or using MnBi as the RC PMs and SrM as the FD PMs in the torque ripple suppressed S-IPMSM 10 show the most promising performance when accounting for the temperature effect and torque performance comparison between the conventional S-IPMSM design and torque ripple suppressed S-IPMSM design. At 20° C., the torque ripple suppressed S-IPMSM 10 with the MnBi/MnBi magnet combination and with the MnBi magnet for the RC PMs and the SrM magnet for the FD PMs has not only increased the average torque by 7.5% and 7.1%, respectively, but also decreased the torque ripple by 48.5% and 50.0%, respectively. At 125° C., the torque ripple suppressed S-IPMSM 10 with MnBi/MnBi magnet combination and the MnBi magnet for the RC PMs and the SrM magnet for the FD PMs enhanced the average torque by 13.2% and 12.5%, respectively, and reduced the torque ripple by 65.0% and 62.9%, respectively. When the temperature increases from 20° C. to 125° C., the torque of the torque ripple suppressed S-IPMSM 10 with the MnBi/MnBi magnet combination and the MnBi magnet as the RC PMs and the SrM magnet as the FD PMs is degraded by 3.8% and 4%, respectively, while the torque ripple is increased by 0% and 9.0%, respectively, as compared to the performance of these combinations at 20° C. Lastly, among the two discussed magnet combinations of the torque ripple suppressed S-IPMSM design, the MnBi/SrM combination is notable for the lower material cost for SrM.

TABLE II

Torque performance of the torque ripple suppressed S-IPMSM 10 with various magnets at 20° C.

| RC magnet | FD magnet | | |
|---|---|---|---|
| | LTP-MNBI | SrM | NdFeB |
| LTP-MnBi | 188.2 Nm (6.9%)† | 187.5 Nm (6.7%) | 191.9 Nm (9.0%) |
| SrM | 176.6 Nm (8.1%) | 175.6 Nm (9.5%) | 181.8 Nm (7.0%) |
| NdFeB | 238.7 Nm (11.3%) | 237.1 Nm (12.0%) | 240.3 Nm (10.2%) |

†Average Torque (Torque Ripple)

TABLE III

Torque performance of the torque ripple suppressed S-IPMSM 10 with various magnets at 125° C.

| RC magnet | FD magnet | | |
|---|---|---|---|
| | LTP-MNBI | SrM | NDFEB |
| LTP-MnBi | 181.1 Nm (6.9%)† | 180.0 Nm (7.3%) | 185.3 Nm (6.2%) |
| SrM | 162.7 Nm (13.6%) | 161.2 Nm (15.1%) | 168.9 Nm (12.1%) |
| NdFeB | 224.9 Nm (15.4%) | 224.0 Nm (15.6%) | 225.6 Nm (15.3%) |

†Average Torque (Torque Ripple)

Figure 5:
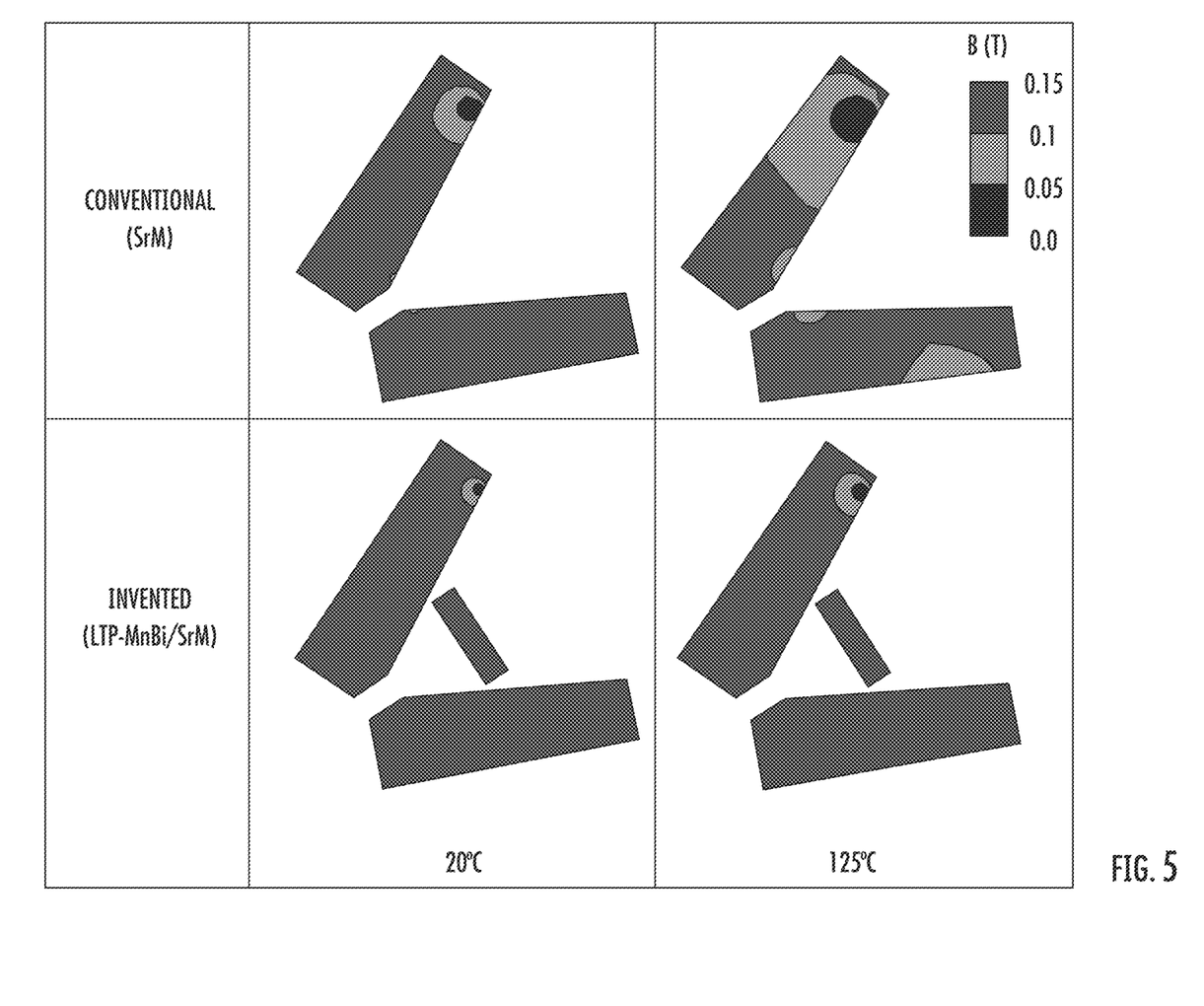
FIG. 5 illustrates the distribution of flux density for the conventional S-IPMSM shown in FIG. 2A, which includes SrM rotor core magnets, and the torque ripple suppressed S-IPMSM shown in FIG. 1A having MnBi rotor core magnets and SrM flux directing magnets at 20° C. and 125° C.

Irreversible demagnetization is detrimental to the motor operation because it degrades the overall performance. This phenomenon occurs when the flux density of the RC magnet at the operating condition is lower than the "knee point" of the demagnetization curve, where the "knee point" is defined as the point where M is equal to 0.9M. See J. M. Niedra, "M-H Characteristics and Demagnetization Resistance of Samarium-Cobalt Permanent Magnets to 300 C," Sverdrup Tech. Inc., Brook Park, Ohio, NAS3-25266, August 2012. Although the knee point of all three PMs is below 0 T, the knee point of 0.1 T is selected for safety. It is also noted that the analysis is conducted at the rated speed of 3,000 rpm and a maximum current of 177 $A_{rms}$. FIG. 5 illustrates the distribution of flux density for the conventional S-IPMSM design using SrM rotor core magnets and torque ripple suppressed S-IPMSM 10 using MnBi rotor core magnets and SrM flux directing magnets at 20° C. and 125° C. The demagnetization rates of the conventional motor and the torque ripple suppressed S-IPMSM 10 at 20° C. are 4.2% and 1.2%, respectively, while at 125° C., the demagnetization rates are 29.1% and 2.8%, respectively. This data shows that the torque ripple suppressed S-IPMSM 10 is better in preventing demagnetization than the conventional S-IPMSM design.

During testing, an Electric Machine Design Toolkits—R16, which is offered by Ansys Maxwell, was employed to evaluate the motor performance, such as torque characteristics, power factor, and maximum speed, at 20° C. and 125° C. Maximum torque per ampere (MTPA) control was applied until the motor reached the base speed, while above the base speed, flux weakening control is utilized with consideration of the DC voltage and applied current constraints, which are 500 V and 177 $A_{rms}$, respectively. As for the voltage control type, space vector pulse width modulation (SVPWM) was used. This control set the maximum controllable voltage as 389 V.

Figure 6A:
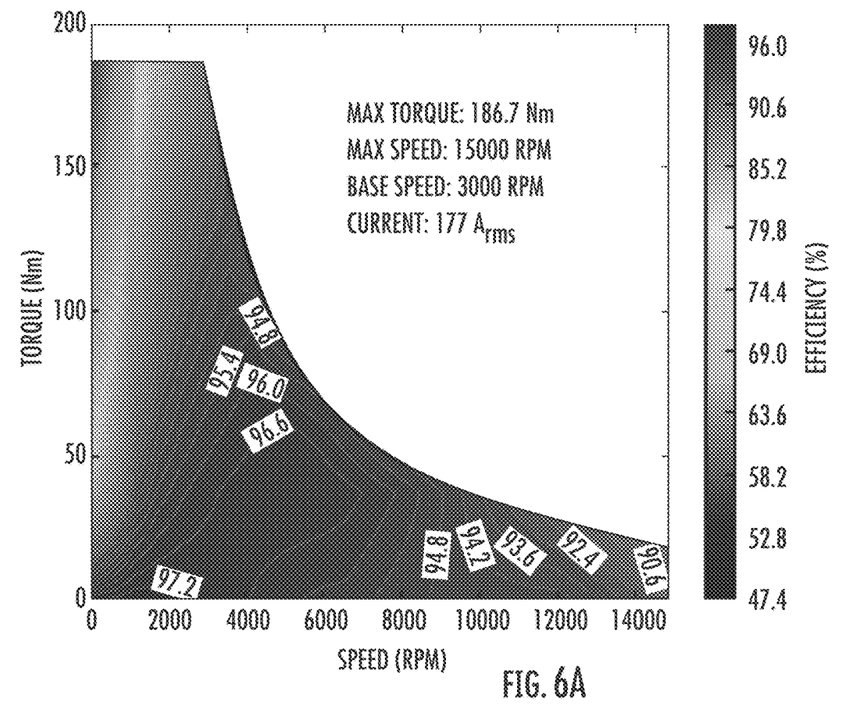
FIG. 6A shows the torque/speed characteristics with efficiency map at 20° C. of the torque ripple suppressed S-IPMSM shown in FIG. 1A having MnBi rotor core magnets and SrM flux directing magnets.
Figure 6B:
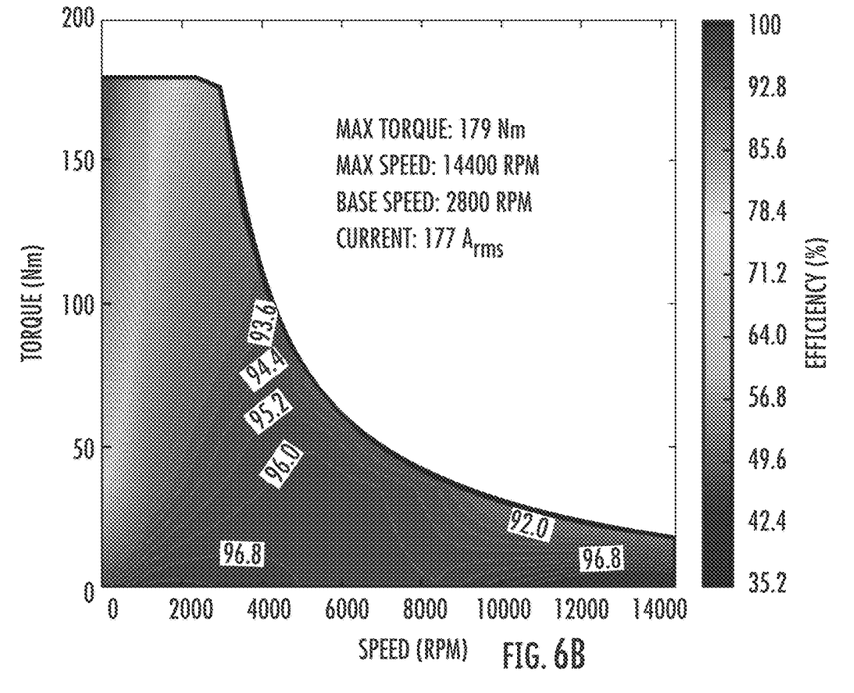
FIG. 6B shows the torque/speed characteristics with efficiency map at 125° C. of the torque ripple suppressed S-IPMSM shown in FIG. 1A having MnBi rotor core magnets and SrM flux directing magnets.

FIGS. 6A and 6B show the torque characteristics in an efficiency map at 20° C. and 125° C., respectively, of the torque ripple suppressed S-IPMSM 10 using MnBi RC PMs and SrM FD PMs, respectively, while Table IV shows the numerical values for various performances of the torque ripple suppressed S-IPMSM 10 at 20° C. and 125° C. The torque ripple suppressed S-IPMSM 10 can produce the maximum torque until 3,000 rpm and 2,400 rpm and sustain its operation up to 15,000 rpm and 14,400 rpm at 20° C. and 125° C., respectively.

TABLE IV

Various performances of the torque ripple suppressed
S-IPMSM 10 at 20° C. and 125° C.

|  | 20° C. | 125° C. |
|---|---|---|
| Maximum torque (Nm) | 186.7 | 179.1 |
| Base/maximum speed (rpm) | 3000/15000 | 2400/14400 |
| Maximum output power (kW) | 58.6 | 55.1 |
| Maximum efficiency (%) | 97.2 | 96.4 |
| Maximum power factor | 0.93 | 0.9 |

Figure 7:
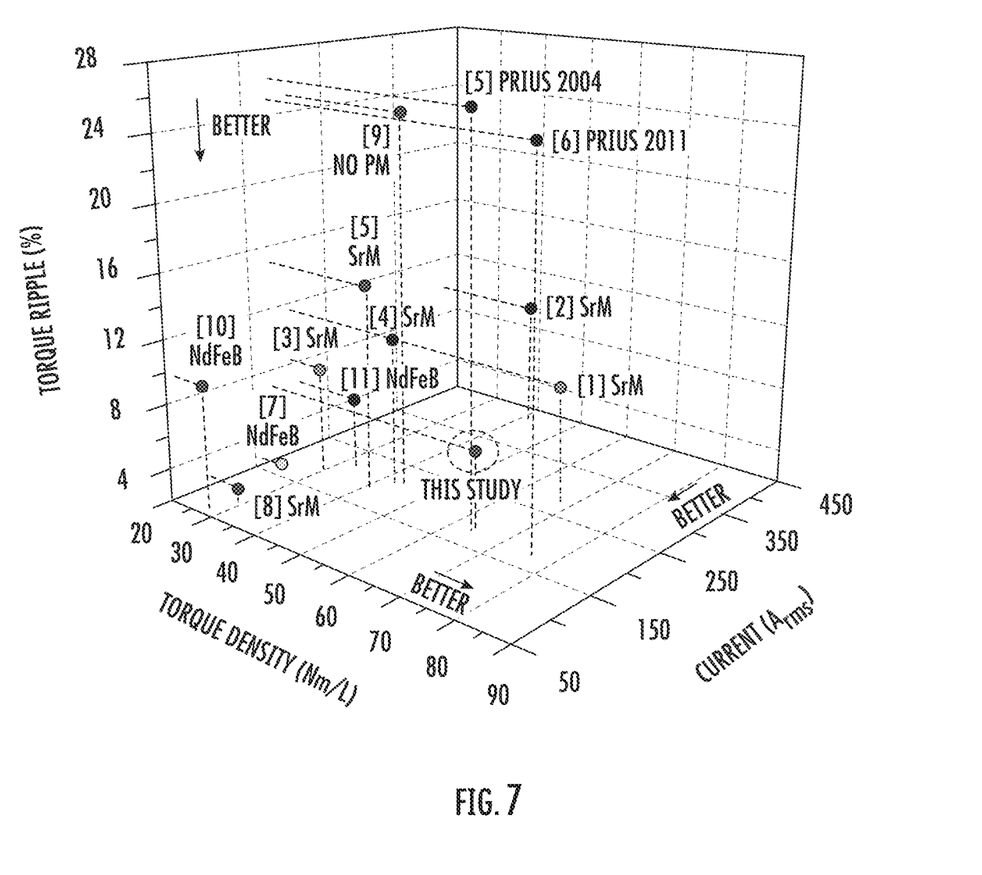
FIG. 7 shows a motor performance comparison of the torque ripple, torque density, and applied current at maximum torque and rated speed in a three dimensions graph, between the torque ripple suppressed S-IPMSM shown in FIG. 1A and conventional S-IPMSM design shown in FIG. 2A.

Lastly, the torque characteristics (torque ripple and torque density) of the torque ripple suppressed S-IPMSM 10 were compared with the torque characteristics reported for conventional S-IPMSM motors, which is shown in FIG. 7 with the corresponding applied current. The torque characteristics of each conventional S-IPMSM design are designated by a reference number, and the source for each reference number is listed below:

[1] W. Kakihara, M. Takemoto, and S. Ogasawara, "Rotor Structure in 50 kW Spoke-Type Interior Permanent Magnet Synchronous Motor with Ferrite Permanent Magnets for Automotive Applications," 2013 *IEEE ECCE*, pp. 606-613, September 2013.

[2] M. Kimiabeigi et al., "High-Performance Low-Cost Electric Motor for Electric Vehicles Using Ferrite Magnets," IEEE Trans. Ind. Electron., vol. 63, pp. 113-122, January 2016.

[3] S. J. Galioto, P. B. Reddy, A. M. El-Refaie, and J. P. Alexander, "Effects of Magnet Types on Performance of High-Speed Spoke Interior-Permanent-Magnet Machines Designed for Traction Applications," IEEE Trans. On Ind. Appl., vol. 51, pp. 2148-2160, May/June 2015.

[4] S. Kim, S. Park, T. Park, J. Cho, and W. Kim, and S. Lim, "Investigation and Experimental Verification of a Novel Spoke-Type Ferrite-Magnet Motor for Electric-Vehicle Traction Drive Applications," IEEE Trans. Ind. Electron., vol. 61, pp. 5763-5770, October 2014.

[5] H. Cai, B. Guan, and L. Xu, "Low-Cost Ferrite PM-Assisted Synchronous Reluctance Machine for Electric Vehicles," *IEEE Trans. Ind. Electron.*, vol. 61, no. 10, pp. 5741-5748, October 2014.

[6] Y. Guan, Z. Q. Zhu, I. A. A. Afinowi, J. C. Mipo, and P. Farah, "Comparison between induction machine and IPM for electric vehicle application," *COMPEL*, vol. 35, no. 2, pp. 572-585, February 2016.

[7] E. Carraro and N. Bianchi, "Design and Comparison of IPMSM with non-uniform airgap and conventional rotor for EV applications," *IET Elec. Power Appl.* vol. 8, iss. 6, pp. 240-249, January 2014.

[8] E. Carraro, N. Bianchi, S. Zhang, and M. Koch, "Performance Comparison of Fractional Slot Concentrated Winding Spoke Type Synchronous Motors with Different Slot-Pole Combinations," *Energy Conversion Congress and Exposition (ECCE)*, 2015 *IEEE*, 6067-6074, 2015.

[9] A. Chiva et al., "Consideration of Number of Series Turns in Switched Reluctance Traction Motor Competitive to HEV IPMSM," *IEEE Trans. Ind. Appl.*, vol. 48, no. 6 November/December 2012.

[10] X. Liu, H. Chen, J. Zhao, and A. Belahcen, "Research on the Performances and Parameters of IPMSM Used for Electric Vehicles," *IEEE Trans. Ind. Electron.* Vol. 63, no. 6, pp. 3533-3545, June 2016.

[11] W. Hua, G. Zhang, and M. Cheng, "Investigation and Design of a High-Power Flux-Switching Permanent Magnet Machine for Hybrid Electric Vehicles," *IEEE Trans. Magn.* vol. 51, no. 3, pp. 8201805, March 2015.

As shown in FIG. 7, the lowest torque ripple was achieved with the torque ripple suppressed S-IPMSM 10 with a high torque density. Therefore, the torque ripple suppressed S-IPMSM motor meets the required torque and torque ripple for electric vehicle (EV) applications.

The torque ripple suppressed S-IPMSM 10 has been shown to significantly reduce the torque ripple while maintaining high torque density by employing flux directing permanent magnets 14 and isosceles trapezoidal nonmagnetic caps 16. Therefore, this torque ripple suppressed S-IPMSM 10 is a very effective design that can produce a low torque ripple, but with high torque density.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

The invention claimed is:

1. An electric rotor comprising:
a cylindrical rotor core having a first end and a second end and an outer surface that extends between the first end and the second end, the cylindrical rotor core defining a central opening, at least two rotor core magnet openings, and at least two flux directing magnet openings, each opening extending axially between the first end and the second end of the cylindrical rotor core,
wherein:
the cylindrical rotor core comprises a soft magnetic material, each rotor core magnet opening is defined radially between the central opening and the outer surface of the cylindrical rotor core and has an inner radial end and an outer radial end that are radially spaced apart from each other a radial length;
each flux directing magnet opening is defined radially between the central opening and the outer surface of the cylindrical rotor core and circumferentially between adjacent rotor core magnet openings; and
the at least two rotor core magnet openings and the at least two flux directing magnet openings are circumferentially spaced apart, and at least one of the flux directing magnet openings is defined circumferentially between two circumferentially adjacent rotor core magnet openings;
at least two rotor core magnets each having a magnetic flux, wherein each rotor core magnet is disposed within the respective rotor core magnet opening adjacent the inner radial end of the respective rotor core magnet opening, magnetic flux directions of the at least two rotor core magnets are circumferentially directed clockwise or counterclockwise, and a direction of the magnetic flux of circumferentially adjacent rotor core magnets are opposite from each other;
at least two nonmagnetic caps, each nonmagnetic cap being disposed radially between the outer radial end of the respective rotor core magnet opening and an outer radial end of the respective rotor core magnet disposed within the respective rotor core magnet opening; and at least two flux directing magnets, wherein each flux directing magnet is disposed within the respective flux directing magnet opening, wherein the magnetic flux directions of the at least two flux directing magnets are directed radially inwardly or outwardly and the magnetic flux directions of circumferentially adjacent flux directing magnets are opposite from each other, wherein each flux directing magnet has an inner radial end and an outer radial end that are radially spaced apart from each other, and the inner radial end of the flux directing magnet is disposed radially outwardly of the inner radial ends of the circumferentially adjacent rotor core magnet openings and the outer radial end of the flux directing magnet opening is disposed radially inwardly of the outer radial ends of the circumferentially adjacent rotor core magnet openings.

2. The electric rotor of claim 1, wherein each nonmagnetic cap comprises two surfaces that are circumferentially spaced apart and taper toward each other in a radially outward direction.

3. The electric rotor of claim 2, wherein each nonmagnetic cap has a trapezoidal cross sectional shape as viewed from an axial direction.

4. The electric rotor of claim 2, wherein each nonmagnetic cap has a semi-circular cross sectional shape as viewed from an axial direction.

5. The electric rotor of claim 1, wherein each nonmagnetic cap has an outer radial end, and the outer radial end of each nonmagnetic cap and the outer radial end of each rotor core magnet opening are spaced apart and define a gap there between.

6. The electric rotor of claim 1, wherein the outer surface of the cylindrical rotor core defines at least two grooves that extend axially between the first and second ends of the cylindrical rotor core, each groove being circumferentially spaced between adjacent rotor core magnet openings.

7. The electric rotor of claim 6, wherein each groove is radially aligned with a respective flux directing magnet.

8. The electric rotor of claim 6, wherein the grooves have a triangular cross sectional shape as viewed from an axial direction.

9. The electric rotor of claim 1, wherein a cross-sectional shape of each flux directing magnet as viewed from an axial direction is rectangular, triangular, trapezoidal, or semi-circular.

10. The electric rotor of claim 1, wherein the at least two flux directing magnets are rare-earth free permanent magnets.

11. The electric rotor of claim 10, wherein the at least two flux directing magnets comprise $SrFe_2O_{19}$ or low temperature phase (LTP)-MnBi.

12. The electric rotor of claim 1, wherein the at least two rotor core magnets are rare-earth free permanent magnets.

13. The electric rotor of claim 12, wherein the at least two rotor core magnets comprise $SrFe_{12}O_{19}$ or low temperature phase (LTP)-MnBi.

14. The electric rotor of claim 1, wherein the at least two rotor core magnets and the at least two flux directing magnets are low temperature phase (LTP)-MnBi magnets.

15. The electric rotor of claim 1, wherein the at least two rotor core magnets are low temperature phase (LTP)-MnBi magnets and are $SrFe_{12}O_{i9}$.

16. The electric rotor of claim 1, wherein the at least two rotor core magnets comprise $SrFe_{12}O_{19}$ magnets and the at least two flux directing magnets comprise $Nd_2Fe_{14}B$ magnets.

17. The electric rotor of claim 1, wherein the at least two flux directing magnets comprise rare-earth permanent magnets.

18. The electric rotor of claim 17, wherein the at least two flux directing magnets comprise $Nd_2Fe_{14}B$.

19. The electric rotor of claim 1, wherein the at least two rotor core magnets comprise rare-earth permanent magnets.

20. The electric rotor of claim 19, wherein the at least two flux directing magnets comprise $Nd_2Fe\ 14B$.

21. An electric rotor comprising:

a cylindrical rotor core having a first end and a second end and an outer surface that extends between the first end and the second end, the cylindrical rotor core defining a central opening and at least two rotor core magnet openings, each rotor core magnet opening extending axially between the first end and the second end of the cylindrical rotor core, wherein:
the cylindrical rotor core comprises a soft magnetic material,
said each rotor core magnet opening is defined radially between the central opening and the outer surface of the cylindrical rotor core and has an inner radial end and an outer radial end that are radially spaced apart from each other a radial length, and
the at least two rotor core magnet openings are circumferentially spaced apart;

at least two rotor core magnets each having a magnetic flux, wherein each rotor core magnet is disposed within the respective rotor core magnet opening adjacent the inner radial end of the respective rotor core magnet opening, magnetic flux directions of the at least two rotor core magnets circumferentially directed clockwise or counterclockwise, and a direction of magnetic flux directions of circumferentially adjacent rotor core magnets are opposite from each other; and at least two nonmagnetic caps, each nonmagnetic cap being disposed radially between the outer radial end of the respective rotor core magnet opening and an outer radial end of the respective rotor core magnet disposed within the respective rotor core magnet opening, each nonmagnetic cap comprising two surfaces that are circumferentially spaced apart and taper toward each other in a radially outward direction.

22. The electric rotor of claim 21, wherein each nonmagnetic cap has a trapezoidal shaped cross section.

23. The electric rotor of claim 21, wherein each nonmagnetic cap has a semi-circular shaped cross section.

24. The electric rotor of claim 21, wherein the cylindrical rotor core further defines at least two flux directing magnet openings, each flux directing magnet opening extending between the first end and the second end of the cylindrical rotor core, and each flux directing magnet opening being defined radially between the central opening and the outer surface of the cylindrical rotor core and circumferentially between adjacent rotor core magnet openings, wherein the at least two rotor core magnet openings and the at least two flux directing magnet openings are circumferentially spaced apart and at least one of the at least two flux directing magnet openings is defined circumferentially between adjacent rotor core magnet openings, the electric rotor further comprising at least two flux directing magnets disposed within respective flux directing magnet openings, wherein magnetic flux directions of the at least two flux directing magnets are directed radially inwardly or radially outwardly and flux directions of circumferentially adjacent flux directing magnets are opposite each other, and wherein each flux directing magnet has an inner radial end and an outer radial end that are radially spaced apart from each other, the inner radial end of the flux directing magnet being disposed radially outwardly of the inner radial ends of circumferentially adjacent rotor core magnet openings and the outer radial ends of the flux directing magnet being disposed radially inwardly of the outer radial ends of the circumferentially adjacent rotor core magnet openings.

25. The electric rotor of claim 21, wherein the cylindrical rotor core defines at least one void that extends axially between the first end and the second end of the cylindrical rotor core, the at least one void being circumferentially spaced apart from circumferentially adjacent rotor core openings.

26. The electric rotor of claim 25, wherein the void is triangular shape.

* * * * *

UNITED STATES PATENT AND TRADEMARK OFFICE
CERTIFICATE OF CORRECTION

PATENT NO. : 10,944,303 B2
APPLICATION NO. : 16/038983
DATED : March 9, 2021
INVENTOR(S) : Yang-Ki Hong Page 1 of 1

It is certified that error appears in the above-identified patent and that said Letters Patent is hereby corrected as shown below:

In the Claims

- Claim 11: Column 13, Line 55: SrFe2O19 should be $SrFe_{12}O_{19}$

- Claim 13: Column 13, Line 60: SrFe12019 should be $SrFe_{12}O_{19}$

- Claim 15: Column 13, Line 67: SrFe120i9 should be $SrFe_{12}O_{19}$

- Claim 16: Column 14, Lines 2 and 3: SrFe12019 should be $SrFe_{12}O_{19}$
    Nd2Fe14B should be $Nd_2Fe_{14}B$

- Claim 18: Column 14, Line 9: Nd2Fe14B should be $Nd_2Fe_{14}B$

- Claim 20: Column 14, Line 13: Nd2Fe 14B should be $Nd_2Fe_{14}B$

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*